United States Patent
Jactat

(10) Patent No.: US 10,999,820 B2
(45) Date of Patent: *May 4, 2021

(54) DEDICATED RADIO RESOURCE CONTROL

(75) Inventor: Caroline Jactat, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/551,416

(22) Filed: Jul. 17, 2012

(65) Prior Publication Data

US 2012/0281613 A1    Nov. 8, 2012

Related U.S. Application Data

(63) Continuation of application No. 12/448,107, filed as application No. PCT/JP2007/074074 on Dec. 7, 2007, now Pat. No. 10,645,673.

(30) Foreign Application Priority Data

Dec. 11, 2006   (GB) ..................... 0624647

(51) Int. Cl.
*H04W 72/00*    (2009.01)
*H04W 76/20*    (2018.01)
(Continued)

(52) U.S. Cl.
CPC ......... *H04W 72/005* (2013.01); *H04W 76/12* (2018.02); *H04W 76/20* (2018.02); *H04W 76/30* (2018.02)

(58) Field of Classification Search
CPC .. H04L 45/16; H04L 29/06027; H04W 72/04; H04W 88/08; H04W 72/0453;
(Continued)

(56) References Cited

U.S. PATENT DOCUMENTS 7,039,416 B2 *  5/2006  Stumpert ............. H04W 28/18
                                                    455/450
7,315,509 B2 *  1/2008  Jeong et al. ................. 370/216
(Continued)

FOREIGN PATENT DOCUMENTS

CN    1406079 A    3/2003
CN    1476260 A    2/2004
(Continued)

OTHER PUBLICATIONS

Japanese Office Action dated Jun. 5, 2012 with a partial English-language translation).
(Continued)

*Primary Examiner* — Christopher P Grey

(57) ABSTRACT

A method of controlling switching between dedicated radio resources of a mobile radio communications network includes providing, using a first radio bearer (RB), a first service to a mobile radio communications device within the network, receiving, from the mobile radio communications device, a message indicating a desired change of service and sending a Radio Resource Control (RRC) message to the mobile radio communications device, the RRC message serving to initiate both release of the first radio bearer, and set-up of a second radio bearer to provide a second service to the mobile radio communications device, the second service being different from the first service.

21 Claims, 2 Drawing Sheets

(51) Int. Cl.
*H04W 76/12* (2018.01)
*H04W 76/30* (2018.01)

(58) Field of Classification Search
CPC ... H04W 72/005; H04W 76/20; H04W 76/12; H04W 76/30; H04W 36/02; H04Q 7/229
USPC ....... 370/328, 329, 331, 341, 431, 432, 437; 725/81; 455/450, 451, 452.1, 464, 509
See application file for complete search history.

(56) References Cited

U.S. PATENT DOCUMENTS

| | | | |
|---|---|---|---|
| 7,400,636 B2 | 7/2008 | Kim et al. | |
| 7,596,379 B2 * | 9/2009 | Farnsworth et al. | 455/450 |
| 7,659,919 B2 * | 2/2010 | Bowen | H04N 5/50 348/14.02 |
| 7,969,932 B2 | 6/2011 | Fischer | |
| 8,208,402 B2 * | 6/2012 | Fischer | H04W 8/245 370/254 |
| 9,003,041 B2 | 4/2015 | Einarsson et al. | |
| 2003/0054863 A1 | 3/2003 | Lee et al. | |
| 2003/0119452 A1 * | 6/2003 | Kim | H04W 52/146 455/69 |
| 2003/0496769 | 8/2003 | Jean-Aicard et al. | |
| 2003/0194992 A1 * | 10/2003 | Kim | H04W 48/12 455/414.1 |
| 2004/0103435 A1 * | 5/2004 | Yi | H04W 72/005 725/81 |
| 2004/0185837 A1 * | 9/2004 | Kim | H04L 29/06027 455/414.3 |
| 2004/0224698 A1 | 11/2004 | Yi et al. | |
| 2005/0037767 A1 | 2/2005 | Kim et al. | |
| 2005/0063339 A1 * | 3/2005 | Jeong | H04B 7/022 370/331 |
| 2005/0213583 A1 * | 9/2005 | Lee | H04W 72/1289 370/395.5 |
| 2006/0035642 A1 * | 2/2006 | Farnsworth | H04W 76/27 455/450 |
| 2006/0058047 A1 | 3/2006 | Jeong et al. | |
| 2006/0106865 A1 | 5/2006 | Beming et al. | |
| 2006/0146858 A1 * | 7/2006 | Kim | H04W 72/005 370/432 |
| 2006/0154627 A1 * | 7/2006 | Wang et al. | 455/130 |
| 2011/0009124 A1 * | 1/2011 | Kostic | H04W 76/15 455/450 |

FOREIGN PATENT DOCUMENTS

| | | |
|---|---|---|
| CN | 1496141 A | 5/2004 |
| CN | 1536795 A | 10/2004 |
| CN | 1627854 A | 6/2005 |
| CN | 1735231 A | 2/2006 |
| CN | 1839590 A | 9/2006 |
| CN | 101039513 A | 9/2007 |
| EP | 1 835 663 A2 | 9/2007 |
| JP | 2002-198891 A | 7/2002 |
| JP | 2005-525065 A | 8/2005 |
| JP | 2007-518306 A | 7/2007 |
| WO | WO-2004064342 A1 * | 7/2004 ......... H04W 72/005 |
| WO | WO-2004/071117 A1 | 8/2004 |
| WO | WO 2005-011157 A1 | 2/2005 |
| WO | WO 2005/067172 A1 | 7/2005 |
| WO | WO 2006/015555 A1 | 2/2006 |

OTHER PUBLICATIONS

Vodafone Group, "MBMS and Mobile TV", 3GPP TSG SA WG2#52, Tdoc S2-061594, May 8-12, 2006, China.
European Search Report dated Jun. 6, 2011.
Siemens: "S1 C-Plane Functions and procedures", 3GPP Draft; R3-061810, 3rd Generation Partnership Project (3GPP), Mobile Competence Center; 650, Route Des Lucioles; F-06921 Sophia-Antipolis Cedex; France; vol. RAN WG3 No. Riga, Latvia; Nov. 1, 2006, Nov. 1, 2006 (Nov. 1, 2006), XP050160693.
Japanese Office Action dated Aug. 6, 2013 with partial English translation.
http://www.quintillion.co.jp/3GPP/TSG_RAN/TSG_RAN2006/TSG_RAN_WG3_Iu11.html R-3-061810, 3GPP TSG RAN WG3 Meeting #54, Riga, Latvia, Nov. 6-10, 2006.
United States Office Action dated Feb. 27, 2014 in U.S. Appl. No. 12/448,107.
Chinese Office Action dated Feb. 17, 2015 with an English translation thereof.
ASUStek, MBMS corrections related to Mobile TV provision [online], 3GPP TSG-RAN WG2#56 3GPP TSG-RAN WG2#56 R2-063525, Internet<URL:http://www.3gpp.org/ftp/tsg_ran/WG2_RL2/TSGR2_56/Documents/R2-063525.zip> Nov. 6, 2006, p. 5,8. 7.6 MBMS modification request [Retrieved Apr. 9, 2015].
Final Office Action dated Nov. 10, 2015, in U.S. Appl. No. 12/448,107.
Chinese Office Action issued by the Chinese Patent Office in counterpart Chinese Patent Application No. 201210407105.X, dated Jul. 19, 2016.
Non-Final Office Action dated May 19, 2016, in parent U.S. Appl. No. 12/448,107.
Office Action issued from the U.S. Patent Office in U.S. Appl. No. 12/448,107, dated Oct. 6, 2017.
Decision to Grant a Patent from the Japanese Patent Office in counterpart Japanese. Patent Application No. 2017-125091, dated Aug. 28, 2018.
United States Office Action dated Oct. 21, 2014 in co-pending U.S. Appl. No. 12/448,107.
Office Action issued by the Chinese Patent Office in counterpart Chinese Patent Application No. 201210407105.X, dated May 4, 2015.
U.S. Office Action dated Apr. 8, 2013 in co-pending U.S. Appl. No. 12/448,107.
Chinese Office Action dated Dec. 3, 2014 with and English Translation thereof.
Chinese Office Action dated Nov. 2, 2014 with an English translation thereof.

* cited by examiner

DEDICATED RADIO RESOURCE CONTROL

The present application is a Continuation Application of U.S. patent application Ser. No. 12/448,107, filed on Jun. 9, 2009, which is based upon and claims the benefit of priority from GB patent application No. 0624647.4, filed on Dec. 11, 2006, the disclosure of which is incorporated herein in its entirety by reference.

BACKGROUND OF THE INVENTION

The present invention relates to method and related apparatus for controlling switching between dedicated radio resources of a mobile radio communications network.

One option for supplying data/services by way of a mobile radio communications network is to offer such data/services by way of dedicated radio resources such as respective Radio Bearers (RBs).

To enhance the choice and variety of data/services available to one or more intended recipients, a requirement arises for the switching between different dedicated radio resources. However, current mechanisms for providing for such improved choice by allowing for switching between such dedicated radio resources exhibit disadvantageous limitations and inefficiencies.

As one of a variety of examples, reference is made in the following discussion to the provision of television services by way of a 30 mobile radio communications network as part of a Multimedia Broadcast Multicast Service (MBMS) broadcast.

In the operating environment for such television service, hereinafter referred to as "Mobile TV", the recipient of the service can only watch one channel at a time. Then when a requirement for switching from one channel to another arises, a mechanism is required to allow for the switching between dedicated radio resources upon which the respective channels are transmitted.

While a possibility exists for providing Mobile TV by way of a point-to-multipoint broadcast system over a mobile radio communications network, radio inefficiencies exists as compared with the use of a point-to-point bearer as has been identified as part of the 3GPP RAN2 meeting of 28 Aug. 2006. Although the use of point-to-multipoint broadcast can offer advantageous characteristics with regard to cell load, the improved bearer and radio resource efficiencies offered by point-to-multipoint system, and the relatively likely low numbers of users requiring reception of a point-to-point MBMS broadcast within a specific cell, dictate that the efficiency requirements for Mobile TV can, in practice, be readily met without limitation by use of dedicated radio resources such as those provided by way of a point-to-point system.

When a recipient of the Mobile TV service wishes to switch from one channel to another, where both channels are transmitted by way of dedicated RB resources, the current RB has to be released prior to establishment of the new RB since two quite separate Radio Resource Control (RRC) messages for these purposes are derived from the 3G Radio Access Network (RAN).

Thus, with reference to, for example, Universal Telecommunications Radio Access Network (UTRAN) the current operational sequence for switching between channels comprises first the delivery of a request to the User Equipment (UE) for the release of the current RB, by means of an RB Release Message, followed by a request to the UE to set-up the RB relating to the new required channel by means of a RB Set-Up Message requiring the UE to perform Dedicated Physical Channel (DPCH) synchronization. Such synchronization is required twice and requires two responses, i.e. one response for each received message, to the UTRAN including Signaling Radio Bearer (SRB) delay time for each response sent.

The duplication of the DPCH frame synchronization, and the sending of the confirmation message for a new configuration, and the related SRB delay, disadvantageously limits the efficiency currently available for Mobile TV when employing the current point-to-point arrangement for switching between the dedicated RB channels.

While the use of point-to-point bearers as compared with a point-to-multipoint broadcast offers improved efficiency for Mobile TV, such efficiencies are nevertheless limited as discussed above.

BRIEF SUMMARY OF THE INVENTION

The present invention seeks to provide for a method and apparatus for switching between dedicated radio resources within a mobile radio communications network and which exhibits advantages over known such methods and apparatus.

In particular, the present invention seeks to improve radio resource efficiency for dedicated radio resource services such as Mobile TV.

According to one aspect of the present invention there is provided a method of controlling switching between dedicated radio resources of a mobile radio communications network including sending an RRC message to UE within the network, the said RRC message requesting both RB release and RB set-up at the UE.

The present invention therefore advantageously provides for a single RRC message for controlling RB release and set-up. In this manner, a much improved and faster switch between dedicated radio resources, for example, a switch between different channels offering Mobile TV, can be experienced at the UE insofar as the processing time within the UE can be greatly reduced. For example, there is no longer any requirement for duplication of the DPCH frame synchronization, and the sending of a separate confirmation message for new configuration, since such actions only need to be performed once.

As an additional advantage, it is noted that the reduction of the signaling overhead in the UTRAN also can be achieved.

While it is appreciated that particular disadvantages in the current art are discussed in relation to a Mobile TV service, and some of the advantages and specific details discussed further below relate to such an environment, it should be appreciated that the present invention finds advantageous use in any scenario requiring switching between dedicated resources such as those arising in relation to 3 GPP Release99, Release6 or Long Term Evolution (LTE) features.

Advantageously, the method also includes the step of sending an RB reconfiguration complete message from the UE to the network.

Preferably, the aforementioned single message can include the RB configurations for both of the dedicated radio resources.

As an alternative, the aforementioned single message can be arranged to include an existing RB configuration but updated to take into account characteristics of the dedicated radio resource to which switching is required.

The method can also include at least one of MBMS service configuration change or PDCP/RLC configuration change by way of an existing RB.

Yet further, the aforementioned single message can also be arranged to change multiplexing of the Medium Access Control (MAC) and, if required, to reconfigure transport channels and physical channels for the dedicated radio resource.

In one particular example of the present invention, the method relates to the switching between dedicated radio resources offering MBMS.

In such an arrangement, the aforementioned single message initiating the reconfiguration exhibits updating of the MBMS service identity.

As a further feature, the reconfiguration message allows for updating of Packet Data Convergence Protocol (PDCP) and/or Radio Link Control (RLC) configurations being updated.

Yet further, and as noted above with particular reference to MBMS transmissions, MAC and physical configurations can be arranged to be reconfigured by way of a single message.

Of course, it will be appreciated that the method of the present invention can be embodied as a method for controlling switching between channels of a Mobile TV service.

According to another aspect of the present invention there is provided a method of initiating switching within the UE of a mobile radio communications network between dedicated radio resources, and including the step of receiving and processing at the UE an RRC message which message is arranged to initiate both RB release and RB set-up within the UE.

Advantageously, the method also includes the step of sending a RB reconfiguration complete message from UE to the network.

Preferably, the single message can include the RB configurations for both of the dedicated radio resources.

As an alternative, the aforementioned single message can be arranged to include an existing RB configuration but updated to take into account characteristics of the dedicated radio resource to which switching is required.

The method can also include at least one of MBMS service configuration change or PDCP/RLC configuration change by way of an existing RB.

Yet further, the aforementioned single message can also be arranged to change multiplexing of the Medium Access Control (MAC) and, if required, to reconfigure transport channels and physical channels for the dedicated radio resource.

In one particular example of the present invention, the method again can relate to the switching between dedicated radio resources offering MBMS.

In such an arrangement, the aforementioned single message initiating the configuration exhibits updating of the MBMS service identity.

As a further feature the reconfiguration message allows for updating of Packet Data Convergence Protocol (PDCP) and/or Radio Link Control (RLC) configurations being updated.

Yet further, and as noted above but having particular reference to MBMS transmissions, MAC and physical configurations arranged to be reconfigured by way of the single message.

Of course, it will be appreciated that the method of the present invention can be embodied as a method for initiating switching between channels of a Mobile TV service.

According to a further aspect of the present invention there is provided a mobile radio communications device arranged to receive dedicated radio resources of a mobile radio communications network and to provide for switching therebetween, the device being arranged to receive an RRC message, which message serves to initiate both RB and RB set-up within the device.

Advantageously, the device is arranged to send an RB reconfiguration complete message from UE to the network.

Preferably, the single message required of the invention can include RB configurations for both of the dedicated radio resources.

As an alternative, the single message can be arranged to include an existing RB configuration but updated to take into account characteristics of the dedicated radio resource to which switching required.

The mobile radio communications device can further be arranged to allow for at least one of a MBMS service configuration change or PDCP RLC configuration change by way of an existing RB.

Yet further, the single message can also be arranged to change multiplexing of the Medium Access Control (MAC) and, if required, to reconfigure transport channels and physical channels for the dedicated radio resource.

In one particular example of the present invention, the device is arranged for switching between dedicated radio resources offering MBMS.

In such an arrangement, the aforementioned single message initiating the configuration exhibits updating of the MBMS service identity.

As further feature the reconfiguration message allows for updating of Packet Data Convergence Protocol (PDCP) and/or Radio Link Control (RLC) configurations being updated.

Yet further, and as noted above but having particular reference to MBMS transmissions, MAC and physical configurations arranged to be reconfigured by way of the single message.

Of course, it will be appreciated that the device of the present invention can include functionality for controlling switching between channels of a Mobile TV service.

According to a still further aspect of the present invention there is provided a network element for use within a mobile radio communications network for controlling switching between dedicated radio resources of the network, the network element being arranged for sending an RRC message to a mobile radio communications device within the network, the said RRC message serving as a request for both RB release and RB set-up within the mobile radio communications device.

As before a single message from the element can advantageously include RB configurations for both of the dedicated radio resources.

As an alternative, the message can be arranged to include an existing RB configuration but updated to take into account characteristics of the dedicated radio resource to which switching is required.

Of course, at least one of a MBMS service configuration change or PDCP/RLC configuration change can be provided by way of an existing RB.

Yet further, the aforementioned single message can also be arranged to change multiplexing of the Medium Access Control (MAC) and, if required, to reconfigure transport channels and physical channels for the dedicated radio resource.

In one particular example of the present invention, the network element is arranged to initiate switching between dedicated radio resources offering MBMS.

In such an arrangement, the message initiating the reconfiguration exhibits updating of the MBMS service identity.

As a further feature the reconfiguration message allows for updating of Packet Date Convergence Protocol (PDCP) and/or Radio Link Control (RLC) configurations being updated. Again, and as noted above but having particular reference to MBMS transmissions, MAC and physical configurations arranged to be reconfigured by way of the single message.

Of course, it will be appreciated that the network element of the present invention can be arranged in particular for controlling switching between channels of a Mobile TV service.

It should therefore be appreciated that the present invention can prove particularly advantageous when relatively low numbers of users are requiring reception of an MBMS broadcast within a specific cell. That this, when a relatively small number of users are present within a cell, a network-operator decision can be taken to transmit using point-to-point resources and which can be based upon a particular threshold level.

Point-to-point resources prove advantageously efficient since the point-to-point RB configuration requires less signaling than that required by a point-to-multipoint RB configuration since, as is appreciated, four MCCH messages, comprising Modify or Unmodify, Common PTM, Current, Neighbor, are required for point-to-multipoint configuration.

Also, in a scenario in which a UE arrives within a cell when no other UEs are receiving the service, the network can readily establish the point-to-point RB configuration for this particular UE whereas, by comparison, with regard to a point-to-multipoint configuration, the UE will not receive the service before the next Modification Period commences.

Also, point-to-point transmission is more reliable than point-to-multipoint and so does not require the network operator to configure neighboring cells for selective/soft combinations in an attempt to improve service reception. For point-to-point configuration however RLC technology mode can be used.

BRIEF DESCRIPTION OF THE SEVERAL VIEWS OF THE DRAWINGS

The invention is described further hereinafter, by way of example only, with reference to the accompanying drawings in which.

DETAILED DESCRIPTION OF THE INVENTION

Figure 1:
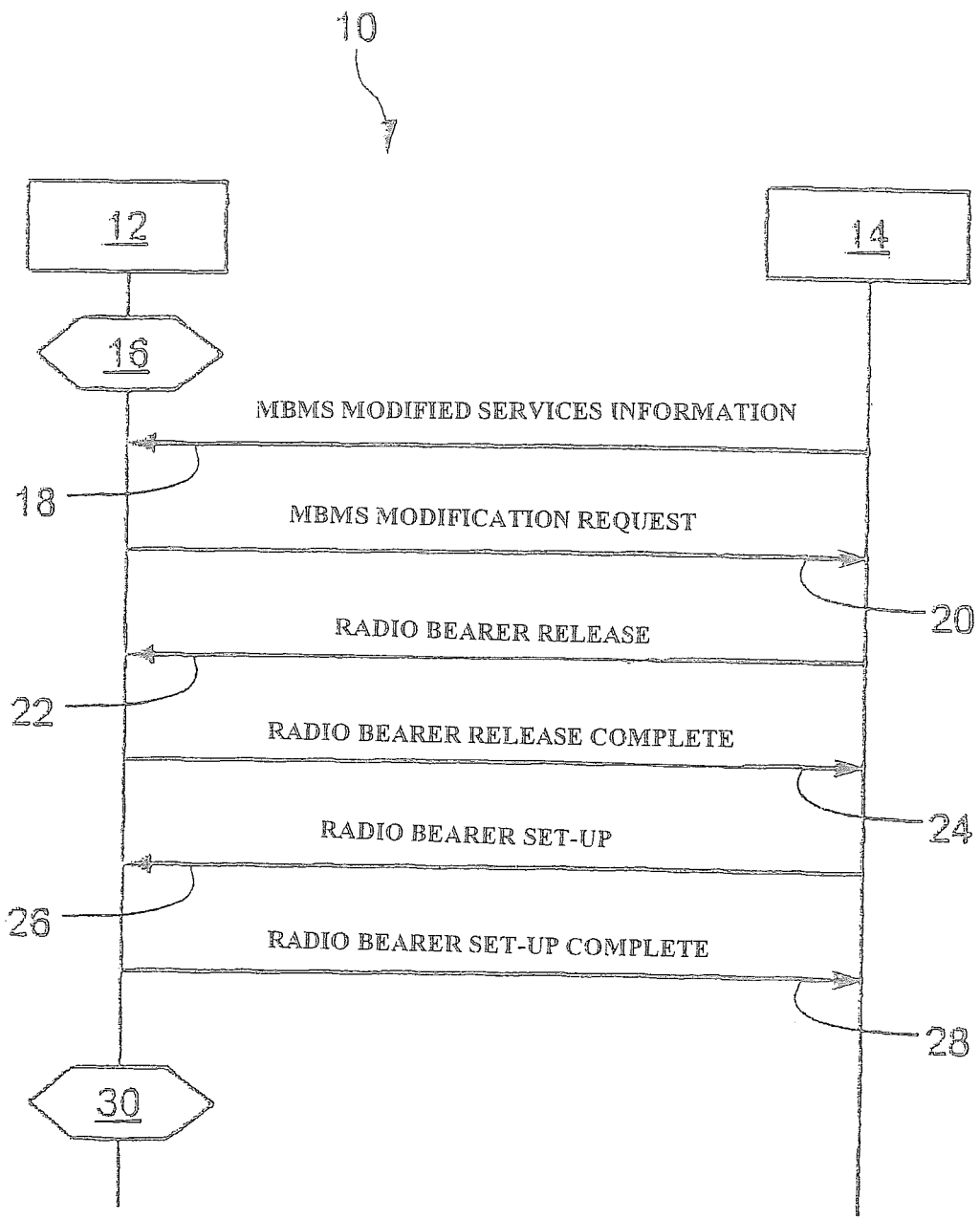
FIG. 1 is a timing diagram illustrating the switching between channels for a Mobile TV service according to the current art.

Turning first to FIG. 1, there is provided a timing diagram 10 for illustrating messaging arising between UE such as mobile radio communications device 12 and a Radio Network Controller (RNC) 14 of a 3G network and by way of which the UE 12 is arranged to receive one of a plurality of possible channels of a Mobile TV service.

Indeed, at 16, it is illustrated that the UE 12 is currently receiving "channel 1" of two possible Mobile TV channels which is delivered by way of point-to-point communication.

Insofar as the UE 12 may be required for the receipt of an alternative channel, for example, "channel 2" as also available on the network, the RNC 14 provides an MBMS Modified Services Information Signal 18 to the UE 12 to confirm that if required, channel 2 is also available. If, at the UE 12, it is determined that channel 2 is preferred to channel 1, the UE is arranged to send an MBMS modification request signal 20 to the RNC 14 indicating that channel 2 will in fact be preferred and that channel 1 can be released.

It should be appreciated that request signal 20 is generated in response to user interaction in the application upper layers within the UE 12 and, since the user can only watch one channel at a time identifies channel 2 as preferred to channel 1.

As will be appreciated from the discussion of FIG. 2 that follows below, the above mentioned initial signaling and control can be common to both the current art and the illustrated embodiment of the present invention.

Remaining however with FIG. 1, and in accordance with the current art, upon receiving signaling 20, the RNC 14 issues a Radio Bearer Release Signal 22 relating to the channel 1 configuration.

Upon receipt of the Radio Bearer Release Signal 22, and completion of the physical release of that RB, the UE 12 issues a Radio Bearer Release Complete Message 24 to the RNC 14.

During this operation, the RRC performs the actions as specified in TS25.331 8.2.2.3 i.e. determine the beginning of the DPCH frame and adjust the radio link accordingly and send back the response to the UTRAN at the latest (100+ TTD ms after completion of the reception of the last TTI carrying the triggering UTRAN→UE message. When the "Target State" is CELL_DCH, the UE response message transmission from the physical layer may be additionally delayed by the value of IE "SRB delay".

Subsequent to the Radio Bearer Release Complete Message 24, the RNC 14 issues a further message 26, requiring radio bearer set-up for the channel 2 configuration.

Once the set-up procedure is complete within the UE 12, the UE 12 issues a Radio Bearer Set-Up Complete Message 28 which is delivered to the RNC 14.

Again, as part of the Radio Bearer Set-Up Completion procedure, the RRC is arranged to perform the particular actions as specified in TS25.331 8.2.2.3 and as discussed above in relation to the Radio Bearer Release Complete Message 24 and noted below.

Thus, within the UTRAN, the current behavior consists of requesting the UE to release current RB using the Radio Bearer Release message followed by a request to the UE to set up the new RB using the Radio Bearer Setup message. This requires the UE to perform the DPCH synchronization (as mentioned in TS25.331.8.2.2.3) twice and two responses (one response for each received message) to the UTRAN including the SRB (Signaling Radio Bearer) delay time for each response are sent. It is then found that the channel switch could take up to 340 ms.

Once the release of channel 1, and subsequent set-up of channel 2, has been completed, the UE 12 continues its Mobile TV reception service but now in relation to channel 2 as indicated at 30.

Figure 2:
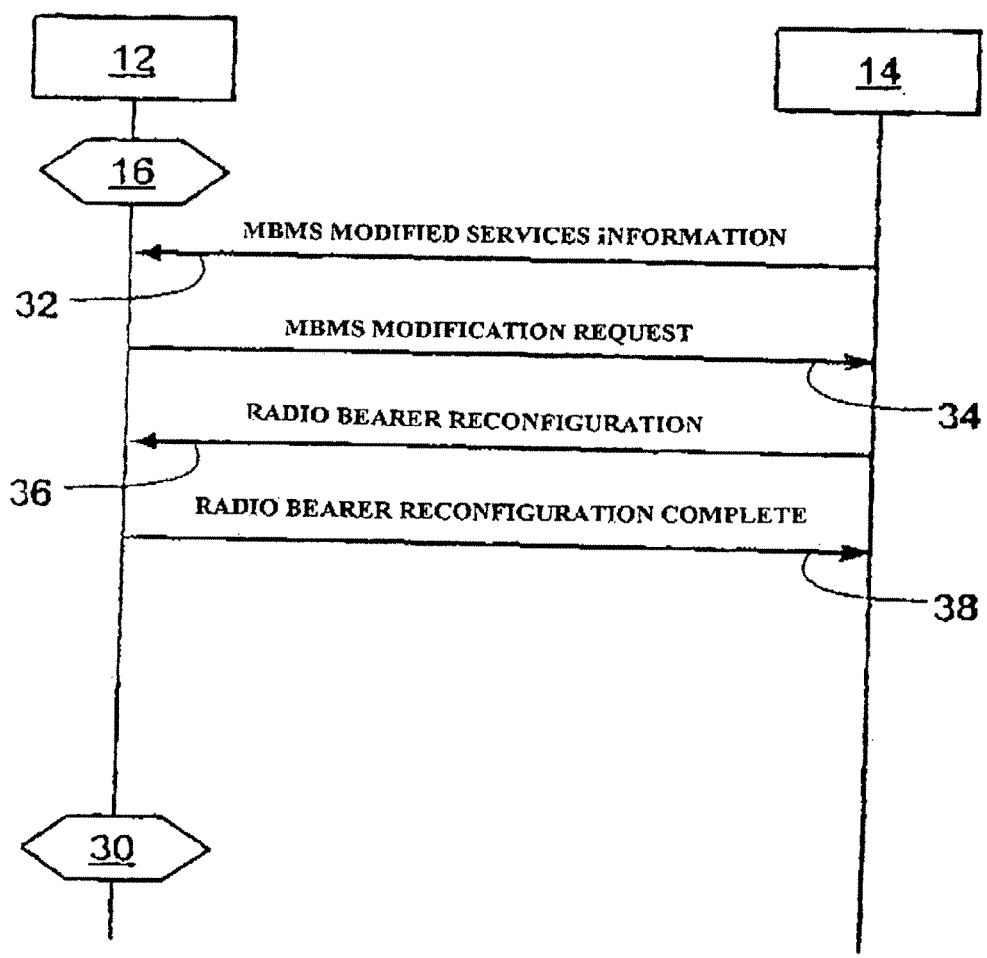
FIG. 2 is a similar timing diagram illustrating switching between different channels of Mobile TV service according to an embodiment of the present invention.

From the following comparison with FIG. 2, the advantages distinguishing features of the present invention will be appreciated.

As noted above, the illustrated embodiment of the present invention again relates to signaling between UE 12 and an RNC 14, and which arises subsequent to the UE 12 receiving a channel 1, 16 of a Mobile TV service.

The UE 12 again receives a MBMS Modified Services Information Signal 32 indicating that channel 2 service is available if required and, subsequent to a decision that the channel 2 will be preferred, the UE 12 issues an MBMS Modification Request 34 indicating that preference to the RNC 14.

Thus, it should be appreciated that the UE 12 is initially receiving channel 1 via a point-to-point RB and the UE 12 is then notified that a new channel, channel 2, is available by way of the point-to-point RB as illustrated by the MBMS Modified Service Information Message 32. As before, and as a result of a request towards the upper application layers of the RRC, the user indicates that it is preferred for UE 12 to receive channel 2 rather than channel 1 and this preference is noted to the UTRAN using the MBMS modification request procedure 34.

Again with regard to the UTRAN, the proposed behavior consists in requesting the UE to release the current RB and set up the new one using only the Radio Bearer Reconfiguration message including (i) both radio bearer configurations, or (ii) the existing radio bearer configuration updated to take into account the new MBMS service.

With particular reference to the latter stages of the operation as illustrated in FIG. 2, once it has been determined at the RNC 14 that a switch of services to channel 2 is required, the RNC 14 is arranged to issue a single Radio Bearer Reconfiguration message 34. As noted above, this single message can either allow for release of the channel 1 configuration, and the set-up of the channel 2 configuration, or alternatively, can allow for updating of the channel 1 configuration so as to adopt a configuration relevant for channel 2. In such a configuration the MBMS service identity, or the PDCP/RRC information, can be adapted having regard to the characteristics of channel 2.

Subsequent to receipt of this single radio bearer reconfiguration message 36 at the UE 12, the reconfiguration requirement is processed within the UE 12 and a Radio Bearer Reconfiguration Complete Message 38 delivered to the RNC 14.

Again, the RRC can perform the actions as specified in TS25.331 8.2.2.3 i.e. determine the beginning of the DPCH frame and adjust the radio link accordingly. It then sends back a response to the UTRAN at the latest (100+TTI) ms after completion of the reception of the last TTI carrying the triggering UTRAN→UE message. When the Target State is CELL_DCH, the UE response message transmission from the physical layer may be additionally delayed by the value of IE "SRB delay".

Then, and as before, the UE 12 continues with receipt of the Mobile TV service but now receives channel 2 as indicated at step 30 of FIG. 2.

Through a comparison between FIGS. 1 and 2, it will be appreciated that switching from channel 1 to channel 2 can be achieved by means of MBMS point-to-point services in a far more speedy and efficient manner than previously and which, in particular, serves to meet the efficiency requirements of Mobile TV services.

Insofar as an embodiment of the invention requires reconfiguration of radio bearers, it is proposed that the current Radio Bearer Reconfiguration message can be altered to allow the following configuration schemes using a single reconfiguration message.

First, the existing point-to-point radio bearer configuration is able to support the new MBMS channel (service), i.e. only the related MBMS service identity is updated (cf. "MBMS Service/Session Identity" information of IE "RB information to reconfigure"). Secondly, PDCP and/or RLC configurations are updated (cf. all information of IE "RB information to reconfigure"). Thirdly, the MAC and physical configurations are changed (cf. IEs "MBMS RB to be released list" and "MBMS RB to be set-up list").

Upon reception of this Information Element (IE) in the message, the RRC performs legacy procedures to either reconfigure the existing RB or release the current RB and set up the new one.

The amendment to the RRC recommendation is outlined below with specific reference to the various sections noted of 3GPP TS 25.331 (Radio resource Control (RRC); Protocol Specification (Release 6)) requirements:

8.6.4 Radio Bearer Information Elements.

[ . . . ]

8.6.4.5 RB Information to Reconfigure.

If the IE "RB information to reconfigure" is included, the UE shall apply the following actions on the radio bearer identified with the value of the IE "RB identity". The UE shall:

[ . . . ]

1> if the IE(s) "MBMS Service Identity" and additionally the "MBMS Session identity" is (are) present:

2> consider the given MBMS service identity/session supersedes the current one for the MBMS radio bearer.

8.6.9 MBMS Specific Information Elements

[ . . . ]

8.6.9.10 MBMS RB to be Released List

If the IE (MBMS RB to be released list" is included the UE shall:

1> perform the actions for the IE "RB information release", according to subclause 10.3.4.19, applied for the list of radio bearers to be released.

8.6.9.11 MBMS RB to be Set-Up List

If the IE "MBMS RB to be set-up list" is included the UE shall:

1> perform the actions for the Ie "RB information to set-up", according to subclause 10.3.4.20, applied for the list of radio bearers to be set-up.

As a further indication of a proposed amendment to the RRC recommendation, section 10.2 "Radio Resource Control Messages" should be revised so as to include a new section 10.2.2 "Radio Bearer Configuration" as follows and with related table in which the "Need" column entries comprise 10.2.2 Radio Bearer Configuration.

This message is sent from UTRAN to reconfigure parameters related to a change of QoS or to a change of (prioritized) MBMS services. This procedure can also change the multiplexing of MAC, reconfigure transport channels and physical channels. This message is also used to perform a handover from GERAN Iu mode to UTRAN.

RLC-SAP: AM or UM or sent through GERAN Iu mode

Logical channel: DCCH or sent through GERAN Iu mode

Direction: UTRAN→UE

| Information Element/Group name | Need | Multi | Type and reference | Semantics description | Version |
|---|---|---|---|---|---|
| Message Type | MP | | Message Type | | |
| UE Information Elements | | | | | |
| RRC transaction identifier | MP | | RRC Transaction identifier 10.3.3.36 | | |
| Integrity check info | CH | | Integrity Check info 10.3.3.16 | | |
| Integrity protection mode Info | OP | | Integrity Protection mode info 10.3.3.19 | The UTRAN Should not include this IE unless it is performing an SRNS relocation or a handover from GERAN Iu mode | |
| Ciphering mode info | OP | | Ciphering mode info 10.3.3.5 | The UTRAN should not include this Ie unless it is performing either an SRNS relocation or a handover from GERAN Iu mode and a change in ciphering algorithm | |
| Activation time | MD | | Activation Time 10.3.3.1 | Default value is "now" | |
| Delay restriction flag | OP | | Enumerated (TRUE) | This IE is always set to TRUE and included if the activation time is restricted according to subclause 8.6.3.1 | REL-6 |
| New U-RNTI | OP | | U-RNTI 10.3.3.47 | | |
| New C-RNTI | OP | | C-RNTI 10.3.3.8 | | |
| New DSCH-RNTI | OP | | DSCH-RNTI 10.3.3.9a | Should not be set in FDD. If received The UE should ignore it | |
| New H-RNTI | OP | | H-RNTI 10.3.3.14a | | REL-5 |
| New Primary E-RNTI | OP | | E-RNTI 10.3.3.10a | | REL-6 |
| New Secondary E-RNTI | OP | | E-RNTI 10.3.3.10A | | REL-6 |
| RRC State Indicator | MP | | RRC State Indicator 10.3.3.35a | | |
| UTRAN DRX cycle length coefficient | OP | | UTRAN DRX cycle length coefficient 10.3.3.49 | | |
| CN information elements | | | | | |
| CN information info | OP | | CN information info 10.3.1.3 | | |
| UTRAN mobility information elements | | | | | |
| URA identity | OP | | URA identity 10.3.2.6 | | |
| CHOICE specification mode | MP | | | | REL-5 |
| >Complete specification | | | | | |
| RB information elements | | | | | |
| >>RAB information to reconfigure list | OP | 1 to <maxRABsetup> | | | |
| >>>RAB information to reconfigure | MP | | RAB information to reconfigure 10.3.4.11 | | |
| >>RB information to reconfigure list | MP | 1 to <maxRB> | | Although this IE is not always required, need is MP to align with ASN.1 | REL-4 |
| | OP | | | | |
| >>>RB information to reconfigure | MP | | RB information to reconfigure 10.3.4.18 | | |

-continued

| Information Element/ Group name | Need | Multi | Type and reference | Semantics description | Version |
|---|---|---|---|---|---|
| >>RB information to be affected list | OP | 1 to <maxRB> | | | |
| >>>RB information to be affected | MP | | RB information to be affected 10.3.4.17 | | |
| >>MBMS RB to be released list | OP | 1 to <maxRB> | | This Ie is needed if the RB are released to set-up other ones e.g. in the case of change of prioritized MBMS services | REL-7onwards |
| >>>RB information to release | MP | | RB information to release 10.3.4.19 | | REL-7onwards |
| >>MBMS RB to be set-up list | OP | 1 to <maxRB> | | This IE is needed if the RB are set-up to replace existing RB e.g. in the case of change of (prioritized) MBMS services | REL-7onwards |
| >>>RB information to set-up | MP | | RB information to set-up 10.3.4.20 | | REL-7onwards |
| >>RB with PDCP context relocation info list | OP | 1 to <maxRBallRABs> | | This IE is needed for each RB having PDCP and performing PDCP context relocation | REL-5 |
| >>>PDCP context relocation info | MP | | PDCP context relocation info 10.3.4.1a | | REL-5 |
| >>PDCP ROHC target mode | OP | | PDCP ROHC target mode 10.3.4.2a | | REL-5 |
| TrCH information Elements Uplink transport channels | | | | | |
| >>UL Transport channel information common for all transport channels | OP | | UL Transport channel information common for all transport channels 10.3.5.24 | | |
| >>Deleted TrCH information list | OP | 1 to <maxTrCH> | | | |
| >>>Deleted UL TrCH information | MP | | Deleted UL TrCH information 10.3.5.5 | | |
| >>Added or Reconfigured TrCH information list | OP | 1 to <maxTrCH> | | | |
| >>Added or Reconfigured UL TrCH information | MP | | Added or Reconfigured UL TrCH information 10.3.5.2 | | |
| Downlink transport channels | | | | | |
| >>DL Transport channel information common for all transport channels | OP | | DL Transport channel information common for all transport channels 10.3.5.6 | | |
| >>Deleted TrCH information list | OP | 1 to <maxTrCH> | | | |
| >>>Deleted DL TrCH information | MP | | Deleted DL TrCH information 10.3.5.4 | | Added or Reconfigured TrCH information list |
| >>Added or Reconfigured TrCH information list | OP | 1 to <maxTrCH> | | | |

-continued

| Information Element/ Group name | Need | Multi | Type and reference | Semantics description | Version |
|---|---|---|---|---|---|
| >>>Added or Reconfigured DL TrCH information | MP | | Added or Reconfigured DL TrCH information 10.3.5.1 | | |
| >Preconfiguration >>CHOICE Preconfiguration mode | MP | | | This value only applies in case the message is sent through GERAN Iu mode | REL-5 |
| >>>Predefined configuration identity | MP | | Predefined configuration identity 10.3.4.5 | | |
| >>>Default configuration >>>Default configuration | MP | | Enumerated (FDD, TDD) | Indicates whether the FDD or TDD version of the default configuration shall be used | |
| >>>>Default configuration identity | MP | | Default configuration identity 10.3.4.0 | | |
| PhyCH information elements | | | | | |
| Frequency info | OP | | Frequency info 10.3.6.36 | | |
| Uplink radio resources | | | | | |
| Maximum allowed UL TX power | MD | | Maximum allowed UL TX power 10.3.6.39 | Default value is the existing maximum UL TX power | |
| Uplink DPCH info | OP | | Uplink DPCH info 10.3.6.88 | | |
| E-DCH Info | OP | | E-DCH Info 10.3.6.97 | | |
| Downlink radio resources | | | | | |
| Downlink HS-PDSCH information | OP | | Downlink HS-PDSCH information 10.3.6.23a | | REL-5 |
| Downlink information common for all radio links | OP | | Downlink HS-PDSCH information 10.3.6.24 | | |
| Downlink information per radio link list | MP | 1 to <maxRL> | | Although this IE is not always required, need is MP to align with ASN.1 | |
| | OP | | | | REL-4 |
| >Downlink information for each radio link | MP | | Downlink information for each radio link 10.3.6.27 | | |
| MBMS PL Service Restriction information | OP | | Enumerated (TRUE) | Absence means that on the MBMS Preferred Layer (PL) no restrictions apply concerning the use of non-MBMS services i.e. the PL is not congested | REL-6 |

Also, with regard to radio bearer information elements, it is proposed that section 10.3.4 be revised as follows to include MBMS service identity information elements as illustrated.

Radio Bearer Information Elements
[ . . . ]
RB Information to Reconfigure

| Information Element/ Group name | Need | Multi | Type and reference | Semantics description | Version |
|---|---|---|---|---|---|
| RB identity | MP | | RB identity 10.3.4.16 | | |
| MBMS Service Identity | OP | | MBMS service identity 10.3.9a.8a | Included when reconfiguring a RB for a MBMS service of the broadcast type | REL-7onwards |
| MBMS Session identity | OP | | MBMS Session identity 10.3.9a.9 | | REL-7onwards |
| PDCP info | OP | | PDCP info 10.3.4.2 | | |
| PDCP SN info | OP | | PDCP SN info 10.3.4.3 | PDCP sequence number info from the network. Present only in case of lossless SRNS relocation | |
| RLC info | OP | | RLC info 10.3.4.23 | | |
| RB mapping info | OP | | RB mapping info 10.3.4.21 | | |
| RB stop/continue | OP | | Enumerated (stop, continue) | | |

This application is based upon and claims the benefit of priority from GB patent application No. 0624647.4, filed on Dec. 11, 2006, the disclosure of which is incorporated herein in its entirety by reference.

The invention claimed is:

1. A method for a network element of a mobile radio communications network, the method comprising:
providing, in a cell, using a radio bearer (RB), a first broadcast service to a mobile radio communications device within the network;
receiving, from the mobile radio communications device, a message indicating a change in selection of broadcast service and including a Multimedia Broadcast Multicast Service (MBMS) service identity information element identifying a second broadcast service which is different from the first broadcast service;
sending a Radio Resource Control (RRC) message to the mobile radio communications device, the RRC message comprising an RB identity information element identifying the RB and the MBMS service identity information element identifying the second broadcast service;
wherein the RRC message serves to update the RB identified by the RB identity information element to provide, in the cell, the second broadcast service to the mobile radio communications device; and
providing, in the cell, using the updated RB, the second broadcast service to the mobile radio communications device.

2. The method as claimed in claim 1, wherein the RRC message comprises a Radio Bearer reconfiguration message.

3. The method as claimed in claim 1, wherein the RRC message further comprises an MBMS session identity information element.

4. The method as claimed in claim 1, wherein the RRC message is configured to change a multiplexing of a Medium Access Control (MAC).

5. The method as claimed in claim 1, wherein the RRC message is configured to reconfigure one or more of a transport channel and a physical channel for the second broadcast service.

6. The method as claimed in claim 1, wherein at least one of the first broadcast service and the second broadcast service includes a MBMS.

7. A method, in a mobile radio communications device of a mobile radio communications network, the method comprising:
receiving in a cell, using a radio bearer (RB), a first broadcast service from a network element within the network;
sending, to the network element, a message indicating a change in selection of broadcast service and including a Multimedia Broadcast Multicast Service (MBMS) service identity information element identifying a second broadcast service which is different from the first broadcast service;
receiving, from the network element, a Radio Resource Control (RRC) message comprising an RB identity information element identifying the RB and the MBMS service identity information element identifying the second broadcast service, the RRC message serving to update the RB identified by the RB identity information element to enable the mobile radio communications device to receive, in the cell, the second broadcast service; and
receiving, in the cell, using the updated RB, the second broadcast service from the network element.

8. The method as claimed in claim 7, further including sending an RB reconfiguration complete message to the network element once the RB has been updated.

9. The method as claimed in claim 7, wherein the RRC message comprises a Radio Bearer reconfiguration message.

10. The method as claimed in claim 7, wherein the RRC message further comprises an MBMS session identity information element.

11. A mobile radio communications device arranged to communicate with a network element of a mobile radio communications network, the device comprising:

a transceiver;

a memory storing instructions; and one or more processors configured to execute the instructions to:

receive in a cell, via the transceiver using a radio bearer (RB), a first broadcast service from the network element;

send, via the transceiver to the network element, a message indicating a change in selection of broadcast service and including an Multimedia Broadcast Multicast Service (MBMS) service identity information element identifying a second broadcast service which is different from the first broadcast service;

receive, via the transceiver from the network element, a Radio Resource Control (RRC) message comprising an RB identity information element identifying the RB and the MBMS service identity information element identifying the second broadcast service, the RRC message serving to update the RB identified by the RB identity information element to enable the mobile radio communications device to receive, in the cell, the second broadcast service; and receive, in the cell, using the updated RB, the second broadcast service from the network element.

12. The device as claimed in claim 11, wherein the one or more processors are further configured to execute the instructions to send, via the transceiver, an RB Reconfiguration Complete message to the network.

13. The device as claimed in claim 11, wherein the RRC message comprises a Radio Bearer reconfiguration message.

14. The device as claimed in claim 11, wherein the RRC message further comprises an MBMS session identity information element.

15. The device as claimed in claim 11, wherein the RRC message is configured to change a multiplexing of a Medium Access Control (MAC).

16. The device as claimed in claim 11, wherein the RRC message is configured to reconfigure one or more of a transport channel and a physical channel for the dedicated radio resource.

17. A network element for use within a mobile radio communications network, the network element composing:

a transceiver;

a memory storing instructions; and one or more processors configured to execute the instructions to:

provide in a cell, via the transceiver using a radio bearer (RB), a first broadcast service to a mobile radio communications device within the network;

receive, via the transceiver from the device, a message indicating a change in selection of broadcast service and including an Multimedia Broadcast Multicast Service (MBMS) service identity information element identifying a second broadcast service which is different from the first broadcast service;

send, via the transceiver, a Radio Resource Control (RRC) message to the mobile radio communications device, the RRC message comprising an RB identity information element identifying the RB and the MBMS service identity information element identifying the second broadcast service, the RRC message serving to update the RB to provide, in the cell, the second broadcast service to the mobile radio communications device; and providing, in the cell, using the updated RB, the second broadcast service to the mobile radio communications device.

18. The network element as claimed in claim 17, wherein the RRC message comprises a Radio Bearer reconfiguration message.

19. The network element as claimed in claim 17, wherein the RRC message further comprises an MBMS session identity information element.

20. The network element as claimed in claim 17, wherein the RRC message is configured to change a multiplexing of a Medium Access Control (MAC).

21. The network element as claimed in claim 17, wherein the RRC message is configured to reconfigure one or more of a transport channel and a physical channel for the broadcast services.

\* \* \* \* \*